(12) United States Patent
Hauser et al.

(10) Patent No.: US 6,334,762 B1
(45) Date of Patent: **\*Jan. 1, 2002**

(54) PISTON PUMP INCLUDING AN EASILY PRODUCED FLOW CONDUIT

(75) Inventors: Manfred Hauser, Schwieberdingen; Norbert Alaze, Markgroeningen; Dieter Merklein, Kempten; Wolfgang Schuller, Sachsenheim; Julius Bayrhof, Lindenberg; Siegfried Fritsch, Sonthofen; Walter Kremsreiter, Hindelang; Franz Mayer, Haldenwang; Joachim Evertz, Sonthofen; Joerg Zielke, Immenstadt; Ralf Zitzelsberger, Marktoberdorf; Andreas Weh, Durach; Bernd Allenzon, Wiggensbach; Michael Hellebrandt, Burgberg; Tobias Fluck, Immenstadt, all of (DE)

(73) Assignee: Robert Bosch GmbH, Stuttgart (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/269,300
(22) PCT Filed: Jun. 18, 1998
(86) PCT No.: PCT/DE98/01671
§ 371 Date: Jun. 30, 1999
§ 102(e) Date: Jun. 30, 1999
(87) PCT Pub. No.: WO99/06707
PCT Pub. Date: Feb. 11, 1999

(30) Foreign Application Priority Data

Jul. 30, 1997 (DE) .............................................. 197 32 791

(51) Int. Cl.$^7$ ............................................................ F04B 1/04
(52) U.S. Cl. ........................... 417/569; 417/549; 417/470
(58) Field of Search .................................... 417/569, 549, 417/554, 312; 92/171.1; 137/539

(56) References Cited

U.S. PATENT DOCUMENTS

| 3,010,435 | A | * | 11/1961 | Abrams | 137/539 |
| 5,123,819 | A | * | 6/1992 | Schuller et al. | 417/569 |
| 5,320,498 | A | * | 6/1994 | Fuchida | 417/554 |
| 5,628,625 | A | * | 5/1997 | Dokas | 417/569 |
| 6,079,961 | A | * | 6/2000 | Schuller et al. | 417/549 |

OTHER PUBLICATIONS

Johnston, Dwight; "Sheet and Strip Cold Roll Forming," Tool Engineers Handbook, 1950; esp. pp. 989–991.*

* cited by examiner

Primary Examiner—Cheryl T. Tyler
(74) Attorney, Agent, or Firm—Ronald E. Greigg; Edwin E. Greigg

(57) ABSTRACT

The invention is directed to a piston pump for a hydraulic vehicle brake system. For simple and inexpensive manufacturability, the piston pump embodies an outlet conduit as a groove in a sleeve bottom and a sealing part. As a result, the sleeve and the sealing part can be manufactured in a non-cutting manner by means of forming. Another advantage of letting the outflow conduit into the sleeve bottom is that the outlet conduit is disposed a small distance in the axial direction from a valve seat of an outlet valve, which counteracts noise production.

10 Claims, 2 Drawing Sheets

PISTON PUMP INCLUDING AN EASILY PRODUCED FLOW CONDUIT

PRIOR ART

The invention relates to a piston pump, which is particularly provided for a vehicle brake system.

Pump pistons of this kind are known in and of themselves. They have a piston that is contained so that the piston can move axially in a sleeve and can be driven into a reciprocating stroke motion. The sleeve is inserted into a cylinder bore of a pump housing, which can constitute a hydraulic block of the vehicle brake system. On an end remote from the piston drive, the cylinder bore is sealed in a pressure-tight manner in relation to the outside with a sealing part that is inserted into it.

In known piston pumps, a check valve is inserted into the sealing part as an outlet valve and cooperates with a valve seat at a bottom of the sleeve. An outflow from the piston pump takes place by means of radial outlet bores in the sealing part or also in the sleeve, which communicate with an outlet in the pump housing. Outlet bores of this kind in the sealing part or in the sleeve have the disadvantage that they must be produced in a cutting fashion in a separate work cycle. Moreover, letting a bore radially into a cylindrical part results in difficulties. The production of the outlet bores is therefore costly and time-consuming.

ADVANTAGES OF THE INVENTION

The piston pump according to the invention, has a through flow conduit as an inlet or outlet, which is constituted by a groove in a bottom of the sleeve and/or by a groove in the sealing part, which is covered by the sealing part or by the sleeve or its bottom so that the groove becomes a conduit. The through flow conduit can also be embodied jointly by a groove in the sleeve and a groove in the sealing part. The through flow conduit is thus disposed between the sealing part and the sleeve. The invention has the advantage that the sleeve and the sealing part, including the through flow conduit that constitutes the pump inlet or pump outlet, can be produced rapidly and inexpensively as formed parts in a non-cutting work cycle, in particular as cold-formed parts, for example by means of cold pressing.

Furthermore, a through flow conduit that is disposed a small distance from the valve seat in the axial direction of the piston pump, which is made possible by means of letting a groove into the sleeve or into the sealing part, counteracts the production of noise when flow passes through the check valve.

In order to reduce noise production when flow passes through the check valve, it is favorable if, starting from a center plane of a valve ball of the check valve, which plane will be called the equator below and simultaneously constitutes a radial plane of the piston pump, the through flow conduit feeds, offset in the direction of the valve seat, into a valve chamber that contains the valve ball. The offset of the mouth of the through flow conduit from the equator of the valve ball to the valve seat should be approx. 20–30% of a radius of the valve ball or more. In other words, viewed in the axial direction, the through flow conduit should lead from the valve chamber close to the valve seat. An explanation for the reduction in noise production is that when flow passes through the check valve, it does not completely circulate around the valve ball, wherein a complex circulation would develop, which would excite the valve ball to uncontrolled oscillating movements, but rather that after passing the valve seat, the flow is deflected directly to the side in the direction of the through flow conduit. As a result, only a small fraction of the surface of the valve ball is subjected to a flow; for the most part, the valve ball is surrounded by static fluid. The requirement to have the through flow conduit come out close to the valve seat can be realized particularly well through its embodiment as a groove, especially if the groove is let into a bottom of the sleeve.

Through the production of the through flow conduit by means of a groove, the through flow conduit can be embodied with no trouble as flat and wide and as a result, can likewise come close to the valve seat in the axial direction. However, this reaches a limit when the through flow resistance becomes too great at a given through flow cross section. A width of the through flow conduit of approx. 60 to 65% of the diameter of the valve ball is viewed as favorable, with a height of the through flow conduit that is approx. 20–30% of its width. Furthermore, the disposition of the mouth of the through flow conduit close to the valve seat has the advantage that the valve ball cannot close the through flow conduit when flow is passing through the check valve since it rests with its equator against a wall of the valve chamber on an end of the through flow conduit remote from the valve seat.

It furthermore aids in the reduction of noise production if only one through flow conduit leads from the valve chamber, since a flow through the valve is deflected exclusively in one direction, namely toward the single through flow conduit, by means of which the valve ball is deflected in the direction of the through flow conduit and rests against the end of the through flow conduit, against the wall of the valve chamber. As a result, an oscillation of the valve ball is prevented. The above-mentioned measures for preventing noise production can also be used with valve closing bodies that differ from the ball shape.

In order to keep the shaping forces low when manufacturing the grooves that constitute the through flow conduit, in one embodiment of the invention, the provision is made that a section of the through flow conduit leading from the valve chamber is let into the sleeve bottom and another, outward-leading part of the through flow conduit is let into the sealing part Since the sleeve is preferably comprised of steel and the sealing part is preferably comprised of an aluminum alloy, the shaping forces are reduced and it is nevertheless possible to dispose the valve-side mouth of the through flow conduit close to the valve seat.

An annular groove preferably in the sealing part, assures that the groove in the sleeve bottom communicates with the groove in the sealing part, independent of an angular position of the sealing part in relation to the sleeve. This obviates the need for measures which assure a rotationally fixed attachment of the sealing part with regard to the sleeve.

The piston pump is provided in particular as a pump in a brake system of a vehicle and is used to control the pressure in wheel brake cylinders. The abbreviations ABS, ASR, FDR, or EHB are used for such brake systems, depending on the type of brake system. In the brake system, the pump serves for instance to return brake fluid from a wheel brake cylinder or a plurality of wheel brake cylinders to a master cylinder (ABS) and/or to supply brake fluid out of a storage tank into a wheel brake cylinder or a plurality of wheel brake cylinders (ASR, FDR, or EHB). The pump is required, for example, in a brake system with wheel slip control (ABS or ASR) and/or a brake system serving as a steering aid (FDR) and/or an electrohydraulic brake system (EHB). With wheel slip control (ADS or ASR), for example, a locking of the wheels of the vehicle during a braking event when there is strong pressure on the brake pedal (ABS) and/or a spinning of the driven wheels of the vehicle when there is strong pressure on the gas pedal (ASR) can be prevented. In a brake system that serves as a steering aid (FDR), a brake pressure is built up in one or more wheel brake cylinders independently of an actuation of the brake pedal or gas pedal, for instance to prevent the vehicle from breaking out of the track desired by the driver. The pump can also be used in an electrohydraulic brake system (EHB) in which the pump supplies the brake fluid into the wheel brake cylinder or cylinders if an electrical brake pedal sensor detects an actuation of the brake pedal or in which the pump is used to fill is a reservoir of the brake system.

BRIEF DESCRIPTION OF THE DRAWINGS

The invention will be explained in more detail below in conjunction with an exemplary embodiment shown in the drawings.

DESCRIPTION OF THE EXEMPLARY EMBODIMENT

Figure 1:
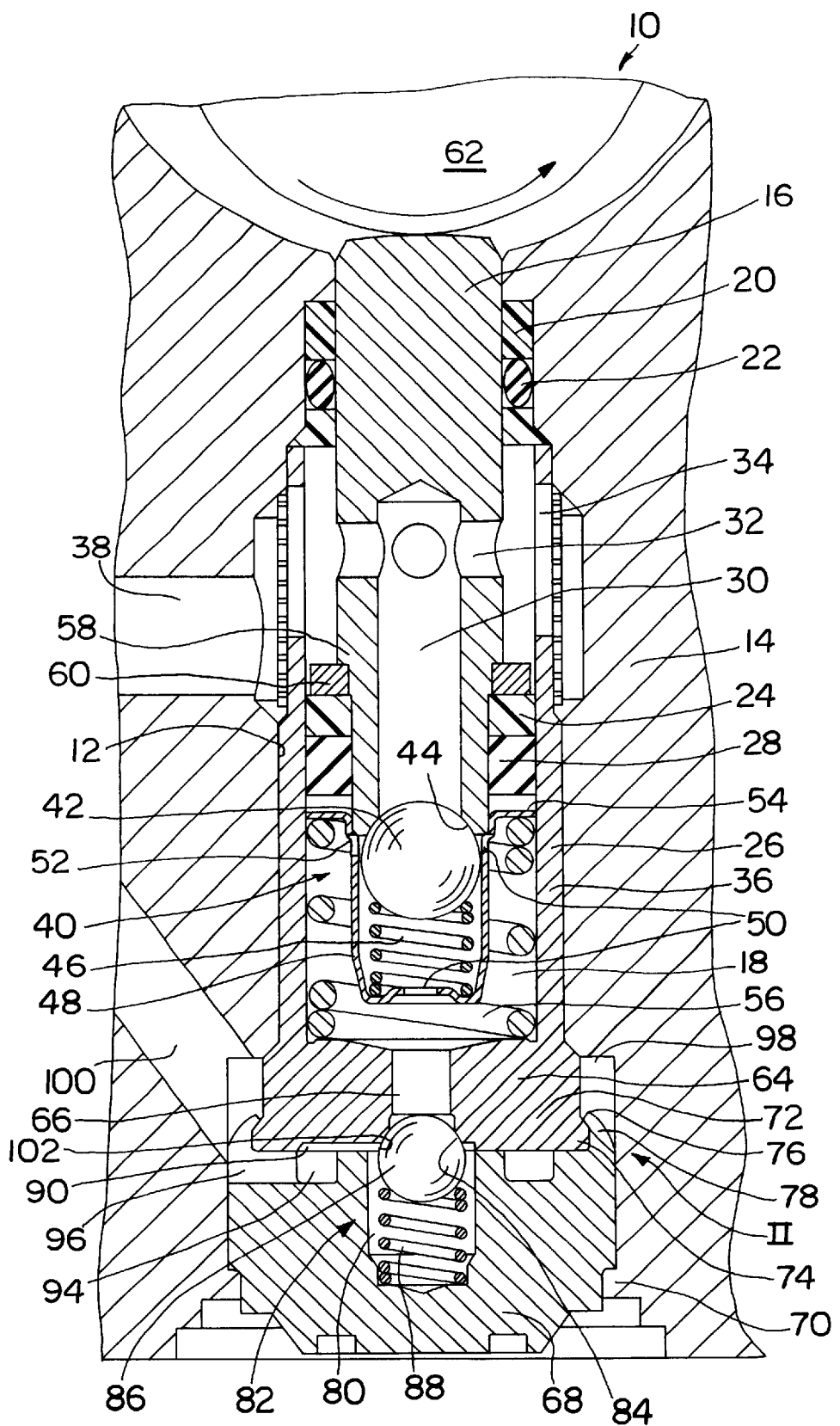
FIG. 1 is an axial section through a piston pump according to the invention.

The preferably selected piston pump according to the invention, which is depicted in FIG. 1 and is labeled as a whole with the reference numeral 10, is inserted into a stepped cylinder bore 12, which is let into a hydraulic block that constitutes a pump housing 14. The hydraulic block, of which only a fraction that encompasses the piston pump 10 is shown in the drawing, is a component of a slip-controlled hydraulic vehicle brake system that is otherwise not shown. Other hydraulic components besides the piston pump 10, such as solenoid valves or pressure reservoirs, are inserted into the housing and are hydraulically connected to each other and to the piston pump 10 according to the invention.

The piston pump 10 has a piston 16 whose one end remote from a compression chamber 18 is guided with a guide ring 20 in the pump housing 14 and is sealed with a sealing ring 22. Another end of the piston 16 oriented toward the compression chamber 18 is guided with a guide ring 24 in a sleeve 26 of the piston pump 10 and is sealed with a sealing ring 28. The sleeve 26 is inserted with a press-fit into the cylinder bore 12 of the pump housing 14. The press-fitting produces a seal between the inlet and outlet side, i.e. between the low and high pressure side of the piston pump 10.

For the pump inlet, an axial blind bore 30 is let into the piston 16 from an end oriented toward the compression chamber 18, which is crossed by transverse bores 32 near its bottom. By means of a window 34 in a circumference wall 36 of the sleeve 24, the blind bore 30 and the transverse bores 32 communicate with an inflow bore 38 that is let into the hydraulic block that constitutes the pump housing 14, radial to the piston pump 10.

As an inlet valve 40, a check valve is affixed in the compression chamber end of the piston 16: the inlet valve 40 has a valve ball 42 as a valve closing body, which cooperates with a conical valve seat 44, which is affixed to a mouth of the blind bore 30 of the piston 16. As a valve closing spring 46, a helical compression spring presses the valve ball 42 against the valve seat 44. The valve ball 42 and valve closing spring 46 are contained in a valve cage 48, which is manufactured out of sheet metal as a cup-shaped deep drawn part, with a diameter that corresponds approximately to the diameter of the piston 16 and is provided with through flow openings 50. The valve cage 48 has an annular step 52 with which it rests against an end face of the piston 16 oriented toward the compression chamber 18. It has an outwardly protruding radial flange 54 that is of one piece with the cage, against which a helical compression spring presses as a piston restoring spring 56, and in this manner, holds the valve cage 48 against the piston 16. The radial flange 54 simultaneously holds the guide ring 24 and the sealing ring 28 between itself and a support ring 60, which is supported on an annular shoulder 58 of the piston 16, in the axial direction against the piston 16.

By way of the radial flange 54 of the valve cage 48, the piston restoring spring 56 presses the piston 16 in the axial direction against a cam 62 that can be driven to rotate by an electric motor and is used to set the piston 16 into a reciprocating stroke motion in an intrinsically known manner.

On the end that adjoins the compression chamber 18, the sleeve 26 has a sleeve bottom 64 that is of one piece with the sleeve and a straight central hole 66 for the pump outlet is let into this sleeve bottom 64.

On the end of the compression chamber directly adjoining the end face of the sleeve bottom 64, a sealing part 68, which has the form of a cylindrical stopper, is inserted into the cylinder bore 12 and is fastened and sealed in the cylinder bore 12 in a fluid-tight manner by means of a caulking 70 of the pump housing 14. The sealing element 68 simultaneously holds the sleeve 26 in the cylinder bore 12.

On an end face oriented toward the sleeve 26, a flat, preferably cylindrical recess 72 is let into the sealing part 68, into which the sleeve 26 is inserted with its end that has the sleeve bottom 64. In order to fasten the sealing part 68 to the sleeve 26, on its end inserted into the sealing part 68, the sleeve 26 has an outwardly protruding radial collar 74 that constitutes an undercut 76 behind which an edge 78 of the recess 72 of the sealing part 68 engages behind. In order to bring the edge 78 into engagement behind the undercut 76, it is reshaped radially inward, for example by means of crimping. A crimp at three to four points on the circumference is sufficient for the fastening.

On a bottom of the recess 72, an axial blind hole 80 is let into the sealing part 68, in which a check valve is accommodated as an outlet valve 82, which cooperates with a ball-shaped valve seat 84 that is affixed to a mouth of the central hole 66 in the sleeve bottom 64, oriented toward the sealing part 68. A valve ball 86 is inserted as a valve closing body into the blind hole 80 of the sealing part 68 and is pressed against the valve seat 84 by a helical compression spring 88 as a valve closing spring.

Figure 2:
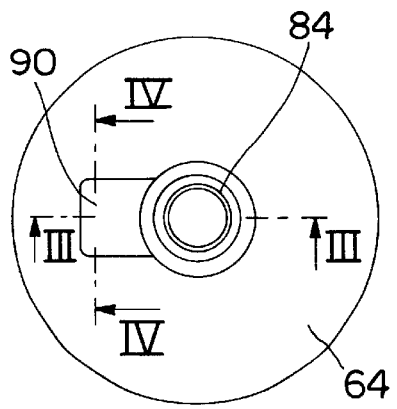
FIG. 2 is a view of an end face of a sleeve bottom that is oriented toward the sealing part and belongs to the piston pump from FIG. 1.
Figure 4:
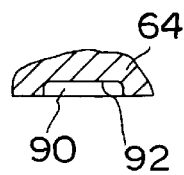
FIG. 4 is a section along line IV—IV in FIG. 2.
Figure 3:
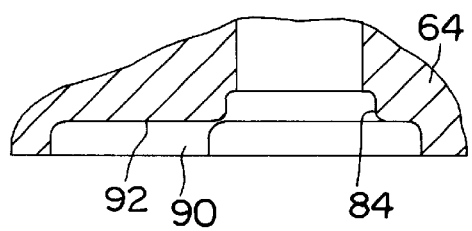
FIG. 3 is a section along line III—III in FIG. 2.

As an outlet, the piston pump 10 shown in FIG. 1 has grooves that are let into end faces of the sleeve bottom 64 and the sealing part 68 and are oriented toward each other, which are each covered by the respective other part, i.e. by the sealing part 68 or by the sleeve bottom 64, to form outlet conduits: the outlet conduits are part of a through flow conduit that extends between the sealing part 68 and the sleeve bottom 64 of the sleeve 26, and in the preferably selected exemplary embodiment, this through flow conduit is comprised of a number of conduit sections. A short, radially extending groove 90 is let into the sleeve bottom 64 and extends from the valve seat 84 of the outlet valve 82 approximately to the center between the valve seat 84 and an outer edge of the sleeve bottom 64 (FIGS. 2 to 4). A groove bottom 92 transitions into the valve seat 84, i.e. the groove 90 that constitutes the outlet conduit is spaced only slightly apart from the valve seat 84 in the axial direction. This kind of a disposition of the outlet conduit close to the valve seat 84 reduces noise production when flow passes through the outlet valve 82 only a single groove 90 is provided in the sleeve bottom 64, by means of which the valve ball 86, which is circulated around, is prevented from striking against a circumference wall of the blind hole 80 when the outlet valve 82 is open and flow is passing through it. The valve ball 86 that is lifted from the valve seat 84 by the outward flow rests against the side of the groove 90 on the circumference wall of the blind hole 80. This also counteracts noise production.

The groove 90 that is disposed in the sleeve bottom 64 and constitutes the outlet conduit is flat and wide. In the exemplary embodiment shown, it has a width of 2.2 mm with a height of 0.5 mm, i.e. an outflow cross section of 1.1 mm$^2$. For comparison: the valve ball 86 has a diameter of 3.5 mm. This means that the groove 90 has a depth-to-width ratio of approximately 0.23, wherein the width of the groove 90 is approximately 0.63 times the diameter of the valve ball 86.

The valve seat 84 is embodied as countersunk into the sleeve bottom 64. This prevents a mechanical damage to the valve seat 84 before the connection of the sleeve 26 with the sealing part 68 and thus reduces undesirable rejection of the sleeve 26, which is transported as a bulk product, or of the entire piston pump 10.

Figure 5:
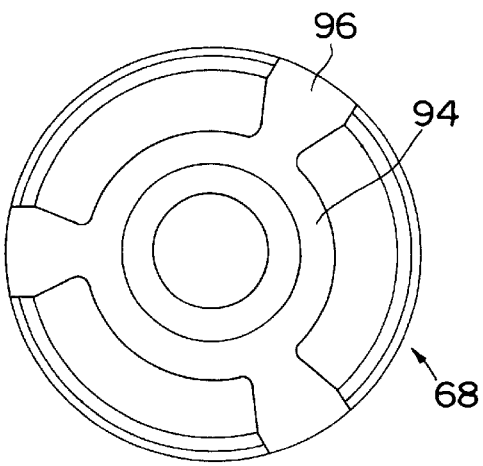
FIG. 5 is a view of an end face of a sealing part that is oriented toward the sleeve bottom and belongs to the piston pump from FIG. 1.

In the vicinity of a radially outer end of the groove 90 in the sleeve bottom 64, a concentric annular groove 94 is let into the end face of the sealing part 68 oriented toward the sleeve bottom 64, and three radial grooves 96 arranged in a star-shape extend from this annular groove 94 to the circumference of the sealing part 68 (FIG. 5). Through the annular groove 94 and the radial grooves 96, the groove 90 in the sleeve bottom 64 communicates with an annular conduit 98 into which an outlet bore 100 of the pump housing 14 feeds. The annular groove 94 in the sealing part 68 assures that the groove 90 in the sleeve bottom 64 is connected, independently of an angular position in which the sealing part 68 is affixed to the sleeve 26. This permits the sealing part 68 to be fastened to the sleeve 26 independently of the angle.

The inlet valve 40 and outlet valve 82 can also be embodied with a reverse through flow direction (not shown) so that the through flow direction of the piston pump 10 reverses. In this instance, the radial grooves 96 and the annular groove 94 in the sealing part 68 and the groove 90 in the sleeve bottom 64 constitute a pump inlet. In other words, the through flow conduit that includes the radial groove 96, the annular groove 94, and the groove 90 is part of an inlet conduit through which the fluid to be pumped can flow out of the outlet bore, which in this instance is an inlet conduit, in the direction of the compression chamber 18. Also in embodiments of the invention, in lieu of the inlet valve 40 and/or the outlet valve 82, an inlet or outlet valve can be inserted into the inlet bore 38 or the outlet bore 100 (not shown).

The sleeve 26 is manufactured out of steel as a cold-pressed part, wherein the center hole 66, the valve seat 84, and the groove 90 in the sleeve bottom 64 are manufactured in a single work cycle along with the production of the sleeve 26. At most, a finishing machining of the valve seat 84 is required. In this manner, the sleeve 26 can be inexpensively and rapidly produced in a non-cutting manner.

The sealing part 68 is manufactured out of aluminum as a cold-pressed part, wherein the annular groove 94 and the radial groove 96 are manufactured in one work cycle along with the sealing part 68 by means of cold pressing. This also brings a considerable cost advantage and time savings in production.

In the exemplary embodiment shown, an end that is oriented toward the sealing part 68 and belongs to a mouth 102, which is oriented toward the valve ball 86 and belongs to the groove 90 that constitutes the outlet conduit and is disposed in the sleeve bottom 64, i.e. of a bottom of the recess 72 of the sealing part 68, is spaced apart by at least 0.3 mm from a center plane of the valve ball 86 radial to a pump axis, i.e. the outlet conduit is disposed offset in the axial direction by approximately 30% or more of a radius of the valve ball 86 from its radial center plane in the direction of the valve seat 84.

By means of its placement, the groove 90 that is disposed in the sleeve bottom 64 and constitutes the outlet conduit is not closed by the valve ball 86.

The foregoing relates to a preferred exemplary embodiment of the invention, it being understood that other variants and embodiments thereof are possible within the spirit and scope of the invention, the latter being defined by the appended claims.

What is claimed is:

1. A piston pump comprising a pump housing, a piston that is driven in a reciprocating stroke motion in the axial direction and is contained so that the piston moves axially in a sleeve (26) which is inserted into said pump housing, a sealing part (68) which is inserted into the pump housing adjacent an end face of the bottom (64) of the sleeve, which end face is oriented toward the sealing part (68), the sealing part being positioned in such a way that it seals the pump housing, the piston pump (10) has a through flow conduit (90, 96) between the sealing part (68) and the sleeve (26), a radially inner part of the through flow conduit (90, 96) is constituted by a radially inner first groove (90) in the sleeve bottom (64), the radially inner first groove communicates with a radially outer second groove (96) of the through flow conduit (90, 96) in the sealing part (68).

2. The piston pump according to claim 1, in which at least one of the sealing part (68) and the sleeve (26) includes an annular groove (94) that constitutes a further component of the through flow conduit (90, 94, 96), and by means of the annular groove, the radially inner first groove (90) communicates with the radially outer second groove (96) of the through flow conduit (90, 94, 96).

3. The piston pump according to claim 1, in which the piston pump (10) has a check valve (82) on the end face of the sleeve (26) oriented toward the sealing part (68), and that on a side of the check valve (82), the through flow conduit has only one mouth (102), which is disposed close to a valve seat (84) of the check valve (82).

4. The piston pump according to claim 3, in which the mouth (102) of the through flow conduit oriented toward the check valve (82) is spaced apart in an axial direction from a center plane of a valve ball (86) of the check valve (82) by a distance that corresponds to at least 30% of a radius of the valve ball (86).

5. The piston pump according to claim 3, in which the mouth (102) of the through flow conduit oriented toward the check valve (82) has a height-to-width ratio of 0.2 to 0.3.

6. The piston pump according to claim 3, in which a mouth (102) of the through flow conduit oriented toward the check valve (82) has a width that is at most 0.65 times a diameter of a valve ball (86) of the check valve (82).

7. The piston pump according to claim 1, in which the sleeve (26) is a cold-formed part.

8. The piston pump according to claim 1, in which the sealing part (68) is a cold-pressed part.

9. The piston pump according to claim 1, in which the sleeve (26) is a cold-pressed part.

10. The piston pump according to claim 1, in which the sealing part (68) is a cold-formed part.

* * * * *